(12) United States Patent
Tabata (10) Patent No.: US 6,313,888 B1
(45) Date of Patent: Nov. 6, 2001

(54) IMAGE DISPLAY DEVICE (75) Inventor: Seiichiro Tabata, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/102,766

(22) Filed: Jun. 23, 1998

(30) Foreign Application Priority Data

Jun. 24, 1997 (JP) ...................................... 9-167455

(51) Int. Cl.$^7$ ...................................... H04N 5/74

(52) U.S. Cl. ........................ 348/790; 348/761; 348/739

(58) Field of Search .................................. 348/739, 744, 348/759, 766, 776, 781, 790, 792, 793, 795, 805; 345/31, 32, 33, 50, 51, 55, 56, 87, 108; H04N 5/66, 5/74

(56) References Cited

FOREIGN PATENT DOCUMENTS

| 61-98073 | * | 5/1986 | (JP) . |
| 61-98073 | * | 10/1995 | (JP) . |
| 8-29779 | * | 2/1996 | (JP) . |
| 9-54554 | * | 2/1997 | (JP) . |

* cited by examiner

Primary Examiner—David E. Harvey
(74) Attorney, Agent, or Firm—Pillsbury Winthrop LLP

(57) ABSTRACT

Oscillating means 4 wobbles or oscillates an optical axis of a light beam emitted from display face of a display device 1 having a display face with a plurality of pixels in a regular array in predetermined directions. Image display control means 2 controls the display of different images on the display device in synchronism to the oscillation of the light beam optical axis caused by the oscillating means 4. Then, light beam splitting means 5 splits the light beam from the display face into a plurality of split light beams in directions crossing the directions of the oscillation of the light beam optical axis caused by the oscillating means 4.

18 Claims, 11 Drawing Sheets

WOBBLING DIRECTION

FIG. 12B

IMAGE DISPLAY DEVICE

BACKGROUND OF THE INVENTION

The present invention relates to image display devices displaying images by a pixel shift through wobbling.

Japanese Laid-Open Patent Publication No. 7-7704 discloses an image display device, in which a pixel shift element having a polarization changing element and a complex refraction medium arranged in the mentioned order, is disposed between a display device having a dispersive pixel array and an image observation position. Odd and even field images are sequentially written in and displayed on the same pixels of the display device. The polarization changing element is driven in synchronism to the in fields to cause selective changes in the polarization plane of light from the display device, so that the optical axis of the emitted light beam is selectively shifted in predetermined directions, that is, display face of the display device is wobbled, thus spatially splitting the odd and even field images to improve the resolution.

However, as a result of various experiments conducted by the inventor, it was found that the above prior art image display service adopting the wobbling, although it permits resolution improvement, has a problem that a stripes pattern observed in the directions of the wobbling is produced and deteriorates the image quality depending on images. Such stripes patterns are observed outstandingly and extremely deteriorate the image quality particularly in the case of a color display device with pixels of three colors in delta arrays.

SUMMARY OF THE INVENTION

The present invention was made in view of the above problem inherent in the prior art, and it has an object of providing an image display device, which can eliminate the directional dependency of the image quality deterioration due to the wobbling, and permitting observation of high resolution and high image quality images.

According to the present invention, there is provided an image display device comprising:

a display device having a display face with a plurality of pixels in a regular array;

oscillating means for oscillating the optical axis of a light beam emitted from the display face in predetermined directions;

image display control means for displaying different images on the display device in synchronism to the oscillation of the light beam optical axis caused by the oscillating means; and light beam splitting means for splitting the light beam from the display face into a plurality of split light beams in directions crossing the directions of the oscillation of the light beam optical axis caused by the oscillating means.

Here, the light beam splitting means is a diffraction lattice or an anisotropic crystal, and the display device is a color display device having pixels of three colors in delta arrays, and the oscillating means is oscillates the optical axis of the light beam from the display face of the color display device in directions oblique to the horizontal array of the pixels such that the pixel pitches in the horizontal and vertical pixel array directions become substantially 0. 75 and 0.5 pitches, respectively.

According to another aspect of the present invention, there is provided an image display device comprising:

to display means having a display face with a plurality of pixels in a regular array;

wobbling means for wobbling or oscillating the optical axis of the light beam from the display device in predetermined directions in a timed relation to the display; and splitting means for splitting the light beam from the display means in directions crossing the wobbling directions into a plurality of split light beams.

According to other aspect of the present invention, there is provided an image display method comprising steps of:

wobbling an optical axis of the light beam emitted from display face of display means having a display face with a plurality of pixels in a regular array in predetermined directions in synchronism to the display of different images on the display device; and splitting the light beam from the display face into a plurality of split light beams in directions crossing the wobbling directions.

Other objects and features will be clarified end from the following description with reference to as attached drawings.

BRIEF DESCRIPTION OF THE DRAWINGS

FIG. 10 shows an example of the head-mounted display, which the image display device as shown in FIG. 1 is applied to;

PREFERRED EMBODIMENTS OF THE INVENTION

Preferred embodiments of the present invention will now be described will now be described with reference to the drawings.

Figure 1:
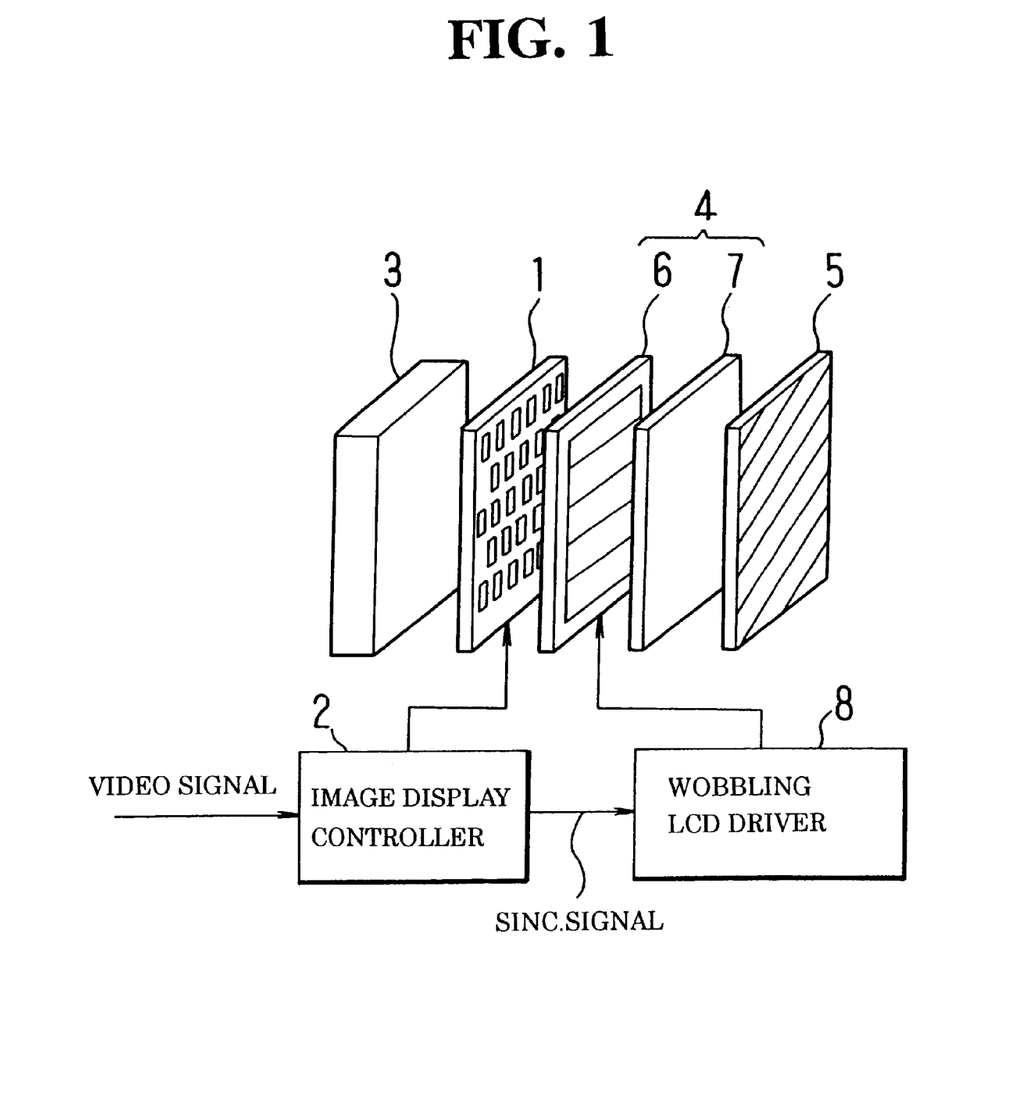
FIG. 1 shows the constitution of an embodiment of the invention in FIG. 1.

FIG. 1 shows the constitution of an embodiment of the invention. In this embodiment, as display device is used a color liquid crystal panel (hereinafter referred to as color LCD) 1, R, G and B pixels in delta arrays in one half the NTSC system scan lines. Odd and even field images of an input video signal are displayed on the same pixels of the color LCD 1 via an image display controller 2, and the optical axis of the light beam from the color LCD 1 is oscillated or wobbled in predetermined directions in a timed relation to the display. Directional dependency of the image quality deterioration due to the wobbling is eliminated by splitting the light beam from the color LCD 1 in directions crossing the wobbling directions into a plurality of split light beams. To this end, a back light emitting white light is disposed behind the color LCD 1, and a wobbling device 4 constituting oscillating means and an optical low-pass filter 5 as light beam splitting means are disposed ahead of the color LCD 1. For the sake of the brevity of the drawing, the color LCD 1 is shown such that it has only several scan lines.

The wobbling device 4 has a liquid crystal plate 6 for changing polarization and a complex refraction plate 7 disposed ahead of the liquid crystal plate 6. A liquid crystal driver 8 on-off controls voltage applied to the liquid crystal plate 6 for changing conversion according to sync signal of the video signal for display on the color LCD 1. In the voltage "on" state, the light beam from the color LCD 1 is transmitted without polarization change. In the voltage "off" state, on the other hand, the light beam from the color LCD 1 is transmitted with a polarization change by 90 degrees. The position at which light beam is emitted from the complex refraction plate 7 is thus changed according to the direction of polarization, thus obtaining the wobbling. The complex refraction plate 7 may be formed from an anisotropic crystal, e.g., rock crystal ($\alpha$-$SiO_2$), lithium niobate ($LiNbO_3$), rutile ($TiO_2$), calcite ($CaCO_3$), soda-nitre ($NaNO_3$), $YVO_4$, etc. The color LCD 1 holds the field image until re-writing thereof with the next field image. Accordingly, one of the opposed electrodes of the liquid crystal plate 6 for changing polarization is divided into a plurality of lines, for instance 5 lines, while using the other one of the opposed electrodes as common electrode, and the voltage application is controlled by selecting the division electrodes in a timed relation to the line scanning of the color LCD 1.

Figure 2A:
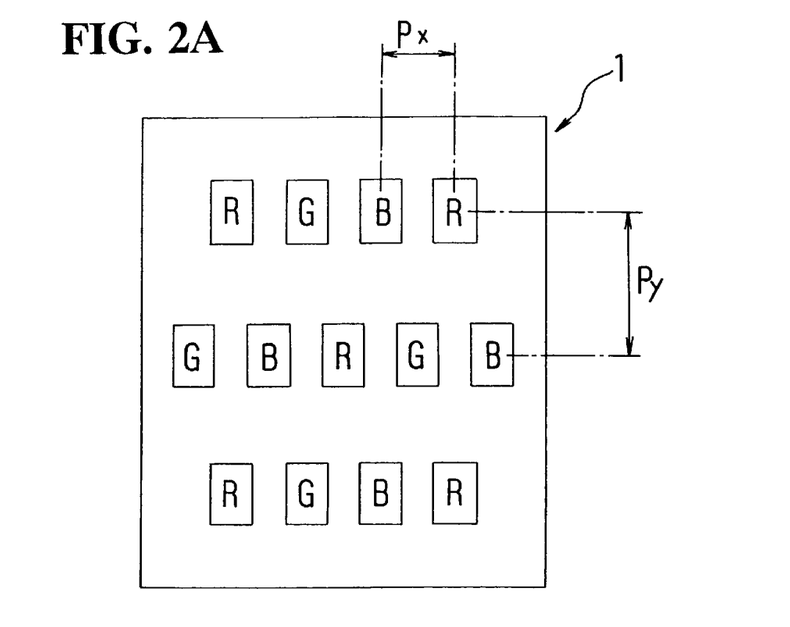
FIGS. 2A and 2B show image pixel array for explaining the wobble device 4 in FIG. 1.

In this embodiment, assuming the horizontal and vertical delta array pixel pitches of the color LCD 1 to be Px and Py as shown in FIG. 2(*a*), odd and even field images are alternately displayed on the color LCD 1 by causing oblique wobbling of 0.75 Px in the horizontal directions and 0.5 Py in the vertical directions. For example, in the case width Px and Py of 18 and 47.5 $\mu$m, respectively, wobbling with a distance of substantially 27.3 $\mu$m is caused in oblique directions deviated by 13.5 and 23.75 $\mu$m in the horizontal and vertical directions, respectively.

Figure 3:
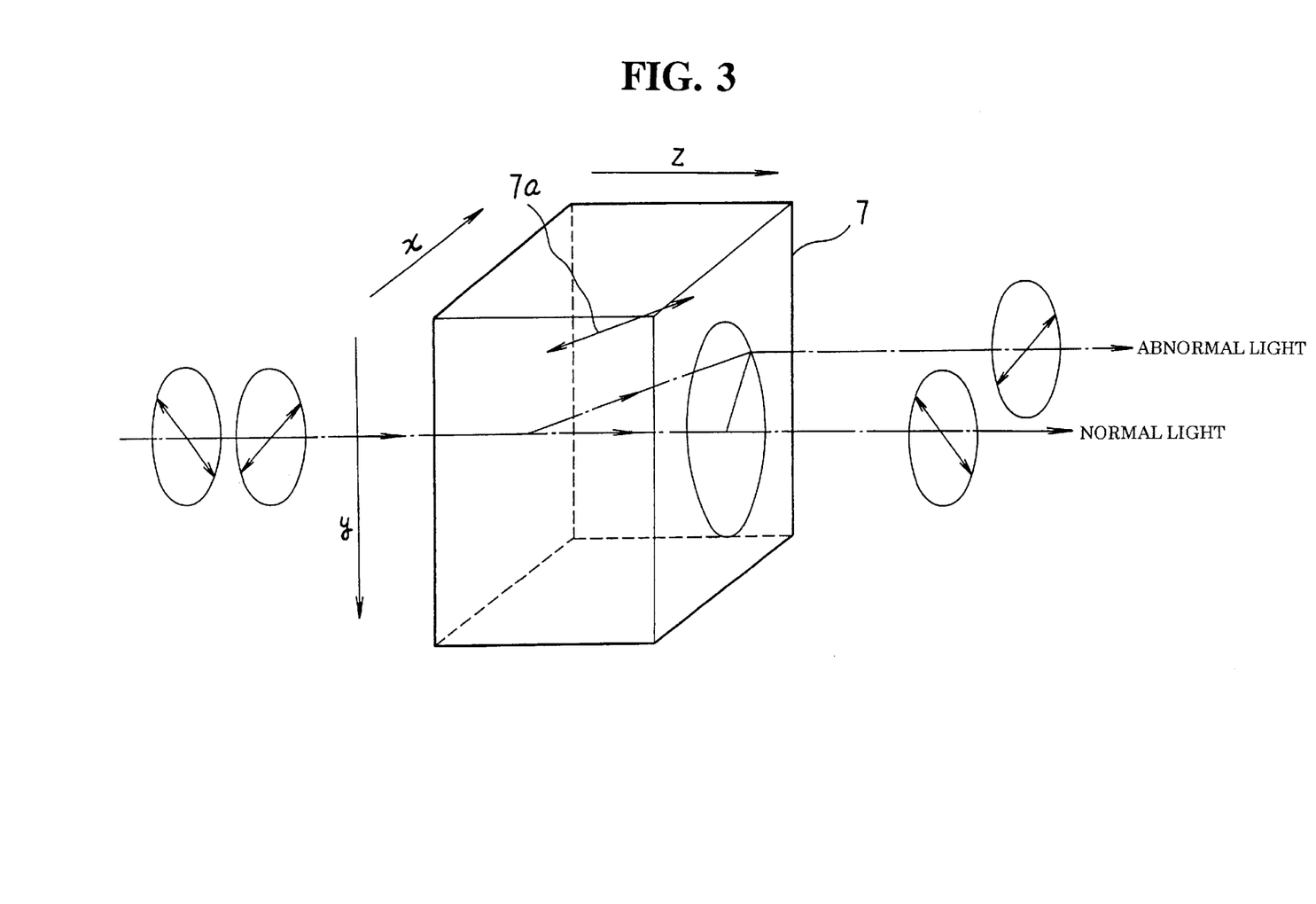
FIG. 3 shows a drawing for explaining the refraction plate 7 in FIG. 1.

To this end, as shown in FIG. 3, the complex refraction plate 7 has its crystallographic axis 7*a* set in a direction, which is slanted with respect to x-y coordinates in the LCD light emission face and to z-direction as normal direction to the x-y coordinates, so that the complex refraction plate 7 transmits the incident light as abnormal light by causing an image shift when the direction of polarization of the incident light coincides with the direction of polarization of the light beam from the LCD 1, while transmitting the incident light without causing any image shift when the polarization direction of the incident light has been rotated by 90 degrees from the polarization direction of the light beam from the LCD 1. In the case of causing wobbling in the oblique directions deviated by 13.5 and 23.75 $\mu$m in the horizontal and vertical directions as noted above, the thickness (i.e., dimension in the z-direction) of the complex refraction plate 7 may be set substantially to 0.68 mm when using lithium niobate and 0.26 mm when using rutile.

Figure 4:
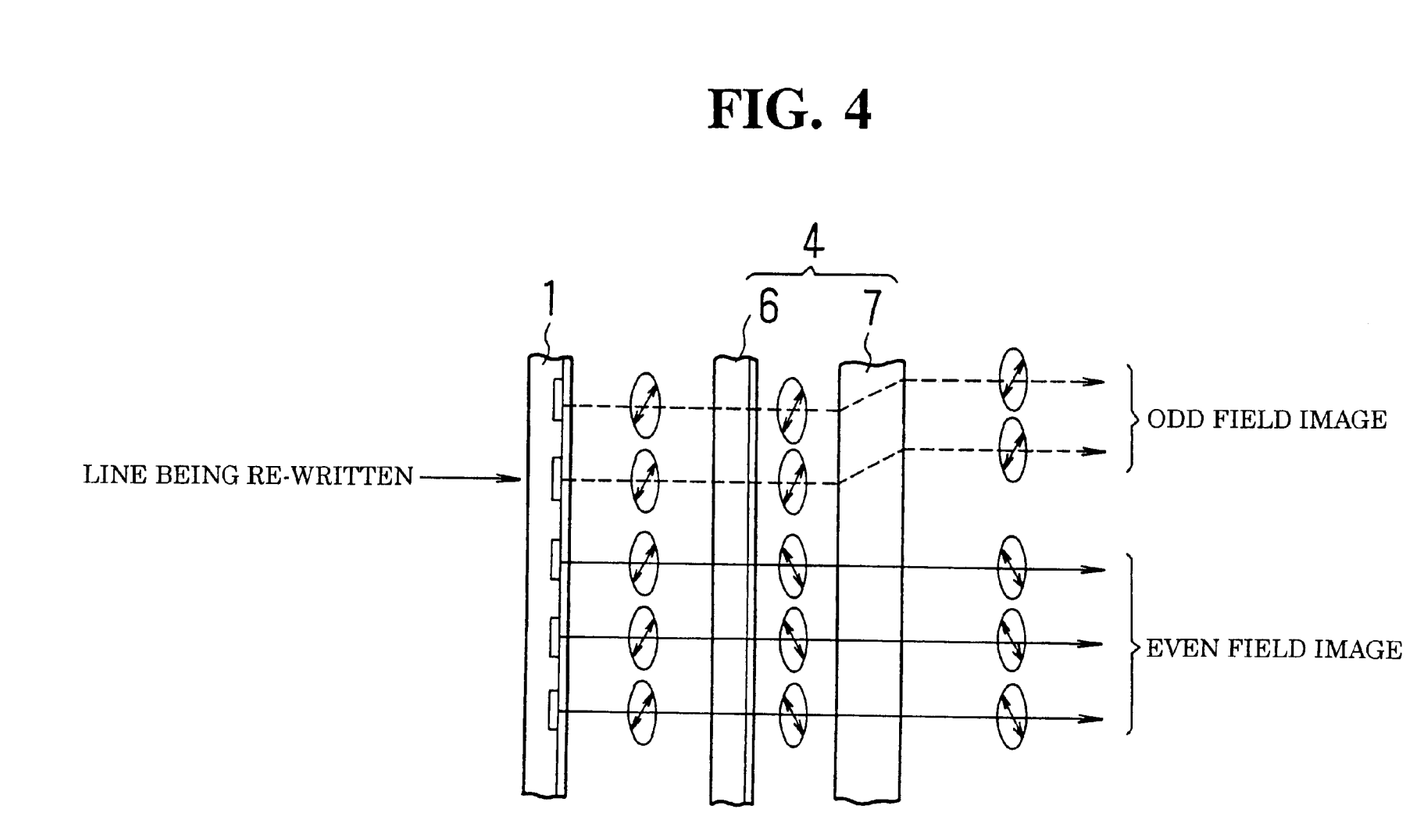
FIG. 4 shows a drawing for explaining the operation of the embodiment in FIG. 1.

As shown in FIG. 4, when an odd field image is displayed on the color LCD 1, the voltage application to the areas the liquid crystal plate 6 that correspond to the horizontal lines to be re-written, is made "on" so that light from these lines is transmitted without rotation of the polarization direction of the light by 90 degrees. An image shift is thus caused, and the light is emitted as abnormal light from the complex refraction plate 7. When an even field image is displayed, on the other hand, the voltage application to the areas of the liquid crystal plate 6 that corresponds to the horizontal lines to be re-written, is made "off" so that light from these lines is transmitted with 90-degree rotation of the polarization direction. No image shift is thus caused, and the light is emitted as normal light from the complex refraction plate 7.

Figure 2B:
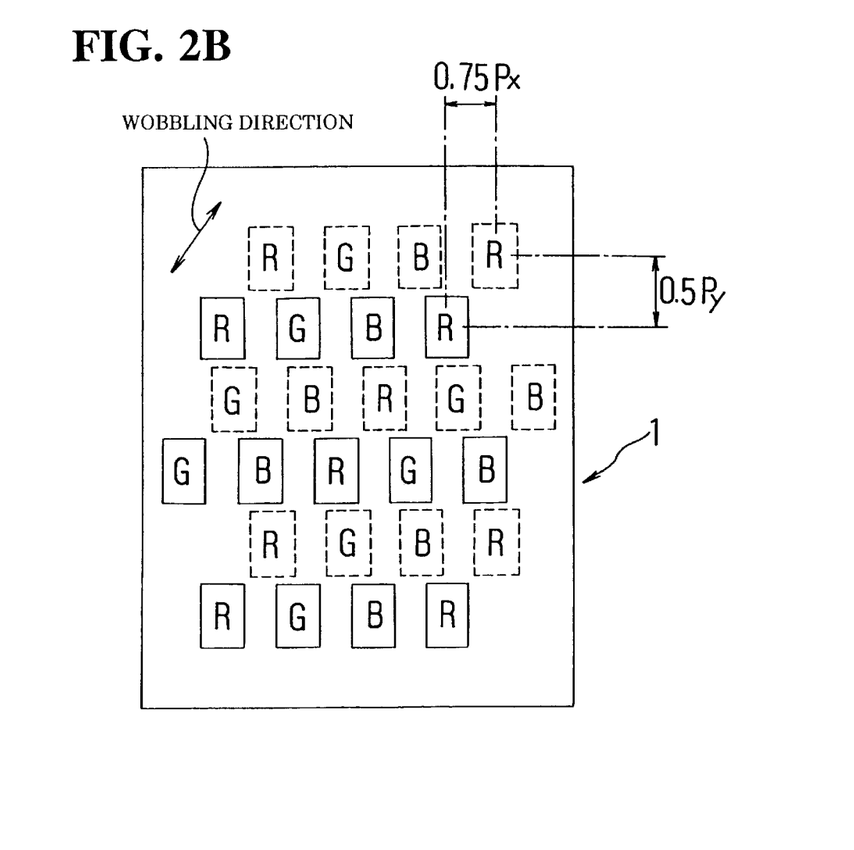

By causing the wobbling as above, it is possible to double the resolutions of the color LCD 1 in the horizontal and vertical directions. In this case, however, as shown in FIG. 2(B), the R, G and B pixels are in rows extending in an oblique direction, resulting in appearance of an oblique stripes if pattern and deterioration of the image quality. To eliminate the directional dependency of the image quality deterioration due to the wobbling, scattering of pixels is caused by splitting the light beam from the color LCD 1 in directions crossing the wobbling directions into a plurality of split light beams through the optical low-pass filter 5.

Figure 5:
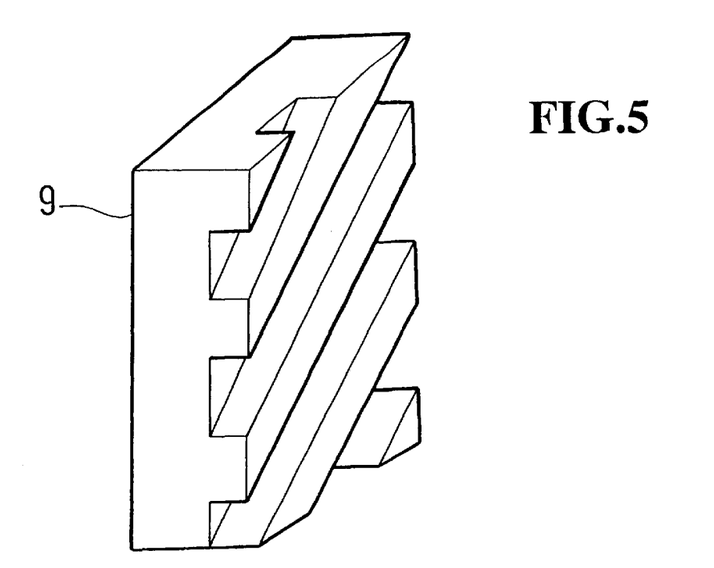
FIG. 5 shows an exemplified constitution of the optical low-pass filter 5 in FIG. 1.
Figure 6:
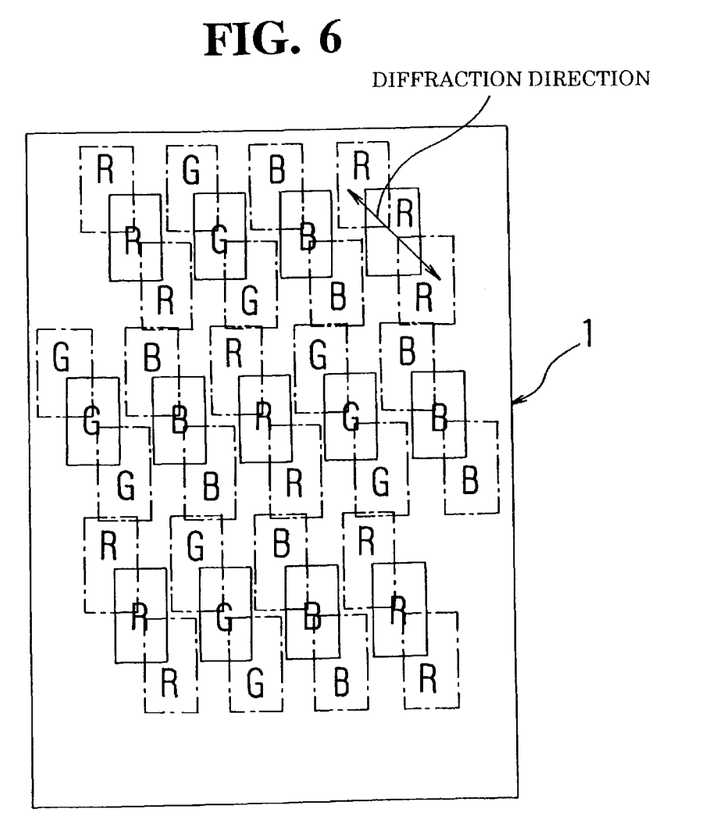
FIGS. 6 and 7 show drawings for explaining the operation of the diffraction grating in FIG. 5.

The optical low-pass filter 5 is constituted by, for instance, a diffraction grating 9 as shown in FIG. 5. In this embodiment, the diffraction grating 9 has grooves extending in a direction, which is substantially coincident with the directions of wobbling caused by the wobbling device 4. The light beam from the color LCD 1 is thus diffracted in a direction substantially perpendicular to the wobbling directions, so that it is split into three split light beams of 0-th degree and ±1-st degree, realizing high resolution and high image quality images. By causing the diffraction of the light beam from the color LCD 1 through the diffraction grating 9 in this way, the pixels as shown in FIG. 2(*a*) are observed as shown in FIG. 6. In FIG. 6, the solid line rectangles show pixels observed as light of 0-th degree, and the phantom line rectangles show pixels observed as light of ±1-st degree. The pixels which are shifted by the wobbling are not shown.

Figure 7:
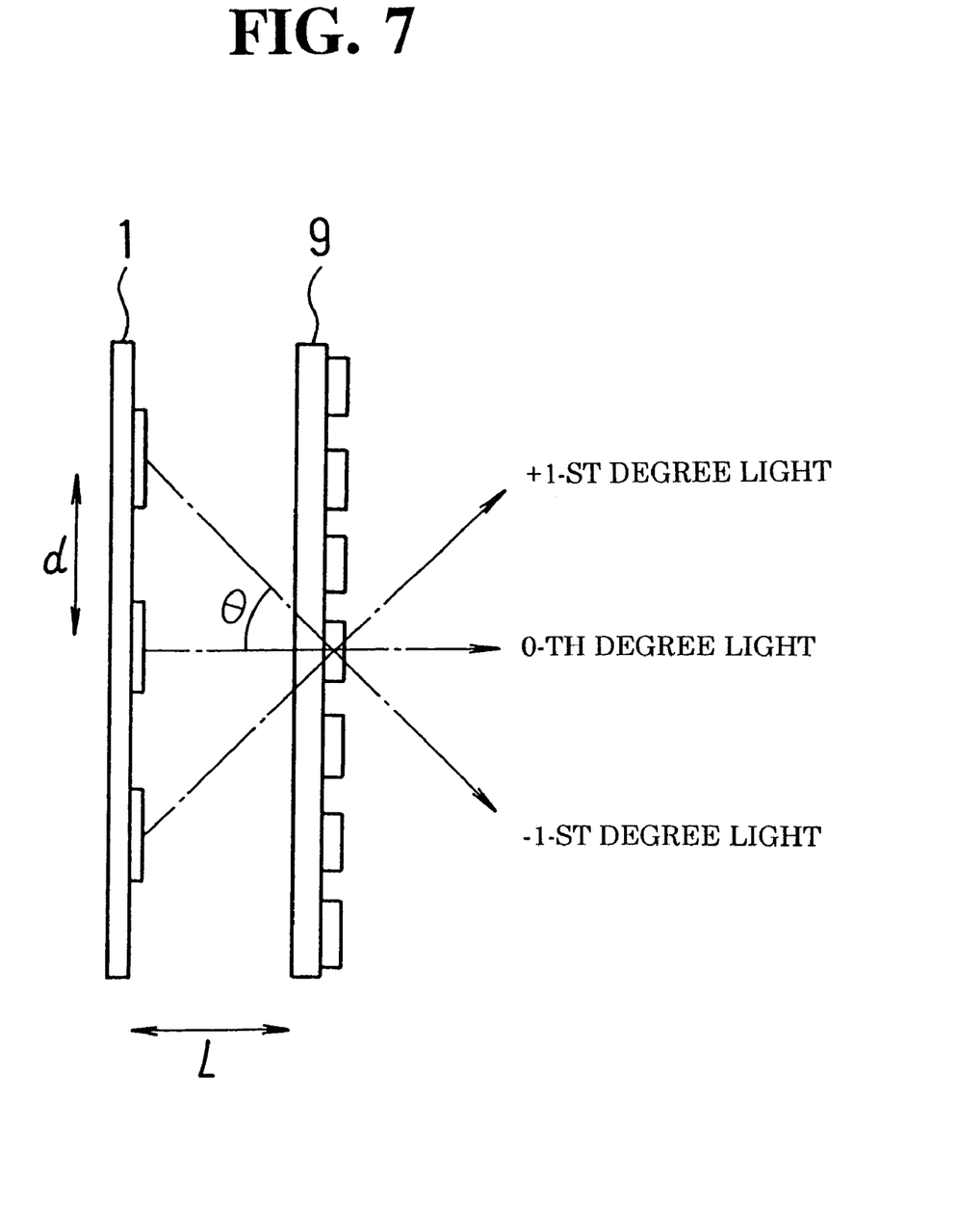

As a result of various experiments conducted in by the inventor, it was found that the diffraction grating 9 is suitably constructed such that the diffraction efficiency of light of 0-th degree is about 70% of the diffraction efficiency of light of ±1-st degree. In addition, as shown in FIG. 7, the diffraction angle $\theta$ of light of ±1-st degree is suitably such that the virtual image of diffracted light on the display face of the color LCD 1 is located such as to be observed in an oblique direction with around 80 and 25% of the horizontal and vertical pixel pitches Px and Py, respectively. For example, in the case of Px of 18 $\mu$m and Py of 47.5 $\mu$m as described above, the diffraction grating 9 is adapted such that virtual images of ±1-st degree are formed such as to be observed in an oblique direction deviated by substantially 14.4 and 12 $\mu$m in the horizontal and vertical directions, respectively. In this case, the distance d between the real and virtual images on the display face is $(14.4^2+12^2)^{1/2} \approx 18.8$ ($\mu$m), and where the distance between the color LCD 1 and the diffrattion grating 9 is 1 mm, the diffrattion angle $\theta$ is substantially 1.1 degrees. The grating pitch of the diffraction grating 9 may be substantially 29 $\mu$m, when the wavelength $\lambda$ of, for instance, the central green light beam is $\lambda$=550 $\mu$m.

Figure 8:
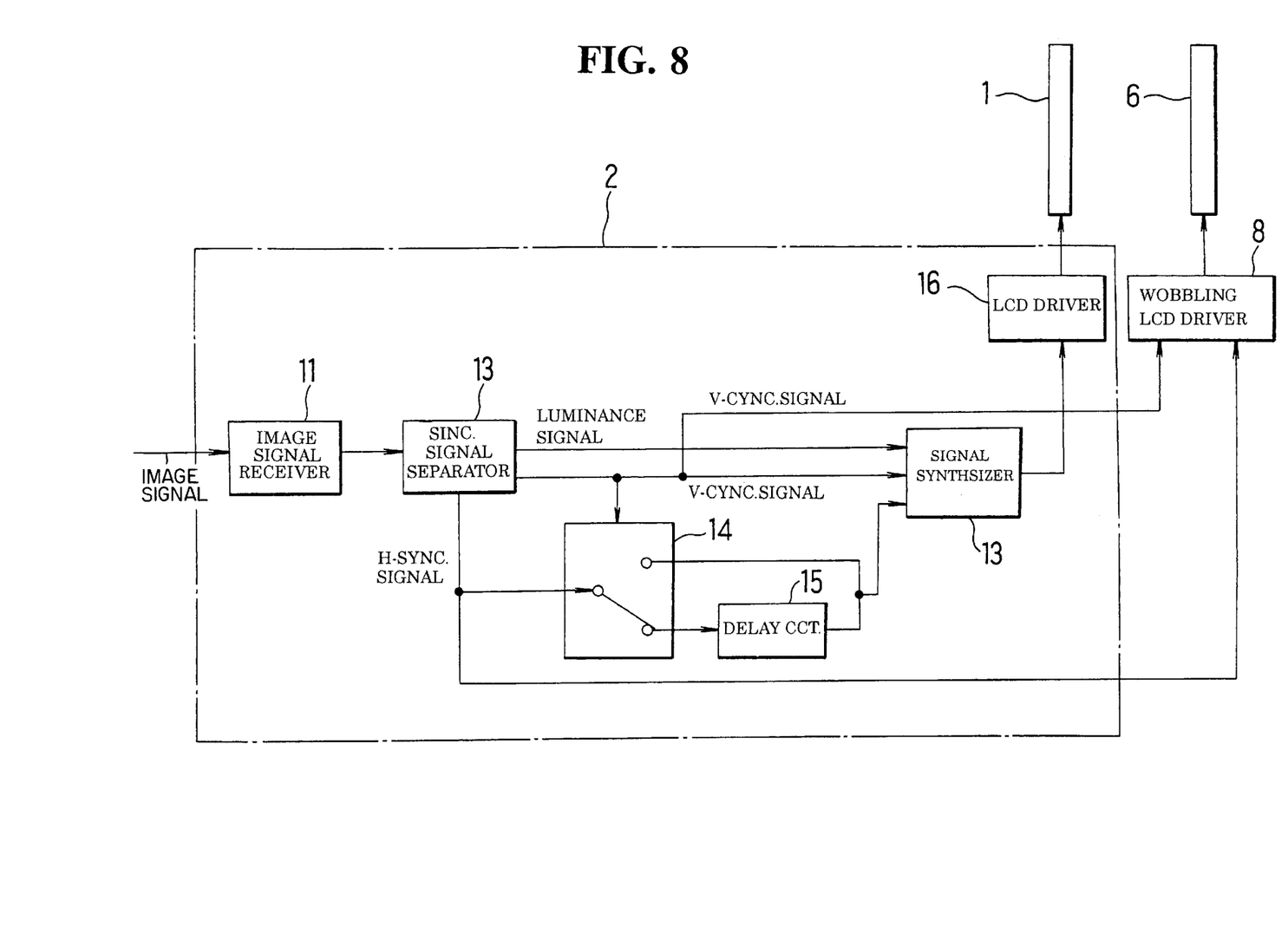
FIG. 8 shows an example of the image display controller 2 shown in FIG. 1.

FIG. 8 shows an example of the image display controller 2 shown in FIG. 1. In this image display controller 2, an image signal receiver 11 receives an input image signal, and a sync signal separator 12 separates luminance signal and horizontal and vertical sync signals. Of the separated signals, the luminance and vertical sync signals are supplied to a signal synthesizer 13, while the horizontal sync If signal is supplied to a switching circuit 14. The switching circuit 14 is controlled for field-by-field switching according to the vertical sync signal, such that for the odd fields the horizontal sync signal is supplied after a delay time corresponding to 0.75 Px provided through a delay line 15 to the signal synthesizer 13, while for the even fields it is supplied not through the delay line 15 but directly to the signal synthesizer 13.

The signal synthesizer 13 combines the luminance and vertical sync signals supplied from the sync signal separator 12 and the horizontal sync signal supplied from the switching circuit 14, and supplies the signal thus synthesized to an LCD driver 16 for alternately displaying odd and even field images on the color LCD 1. The horizontal and vertical sync signals separated in the sync separator 12 are also supplied to a liquid crystal driver 8 for wobbling, thus controlling the voltage application to the liquid crystal plate 6 for changing polarization as described above.

In the above way, the image signal is sampled by causing a delay of odd field image for a time corresponding to 0.75 Px, i.e., corresponding to a horizontal pixel shift, relative to even field image, is displayed on the color LCD 1 for wobbling. It is thus possible to display high resolution image sampled at different timings with odd and even field images on the display face.

Figure 9:
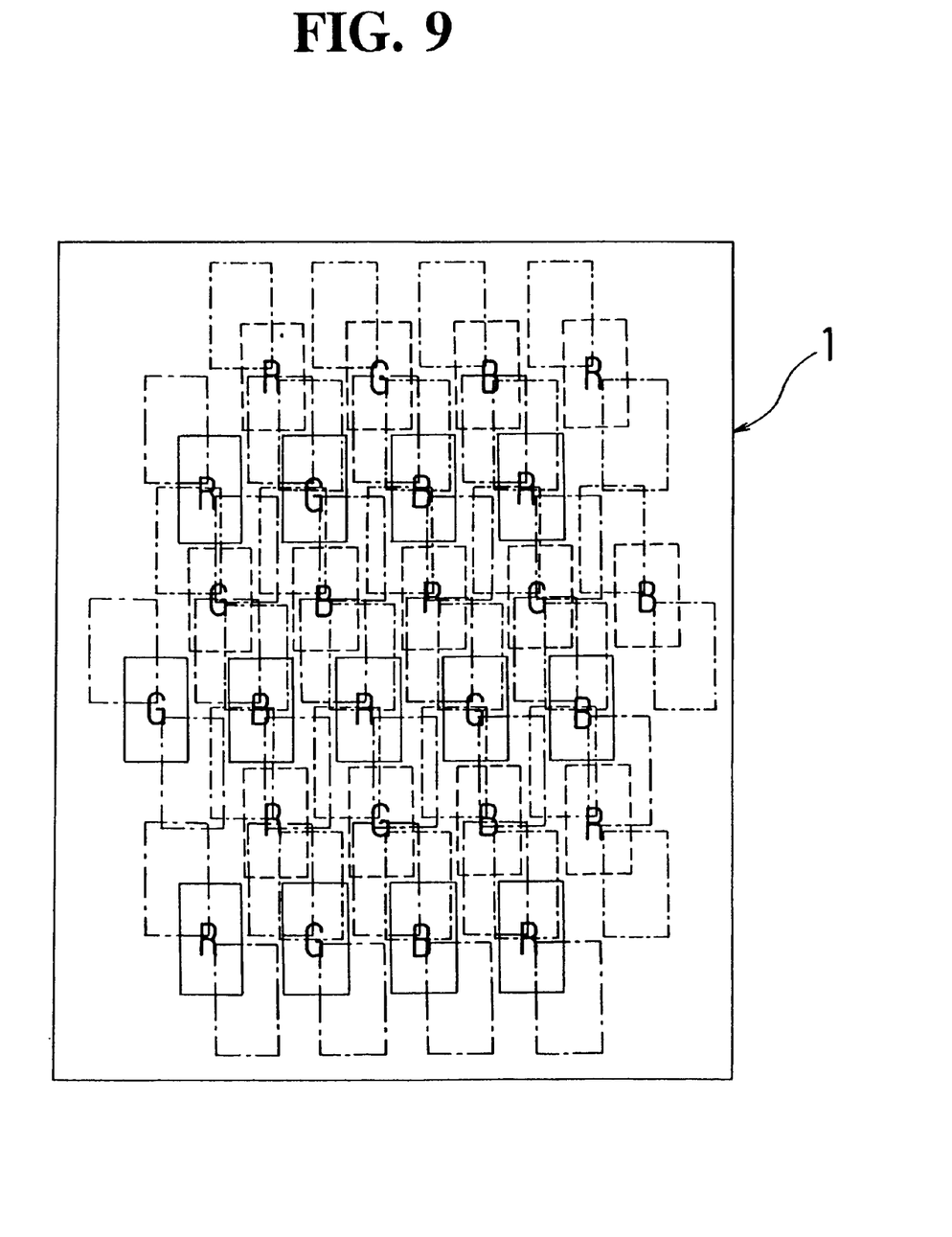
FIG. 9 shows the display face pixels of the color LCD 1 that are observed in the embodiment.

FIG. 9 shows the display face pixels of the color LCD 1 that are observed in this embodiment. Referring to FIG. 9, the solid line rectangles show the pixel positions on the color LCD 1 as shown in FIG. 2(*a*), the broken line rectangles show the wobbled pixel positions as shown in FIG. 2(*b*), and the phantom line rectangles show the diffracted pixel positions as shown in FIG. 6. It will be seen from FIG. 9 that the individual pixels on the color LCD 1 have been diffracted at the intrinsic, i.e., non-shift, positions and also diffracted at the shifted positions obtained by the wobbling.

As has been shown, in this embodiment it is possible to double the resolution of the delta array color LCD 1 in both the vertical and horizontal directions by the wobbling, and also effectively remove the directional dependency of the image quality deterioration due to the wobbling with diffracting action of the diffraction grating 9. Thus, it is possible to permit observation of high resolution, and high image quality images. Furthermore, since the light beam splitting means is constituted by the diffraction grating 9, it is possible to obtain light of any degree without being affected by the polarization and thus improve the design freedom degree.

Figure 10:
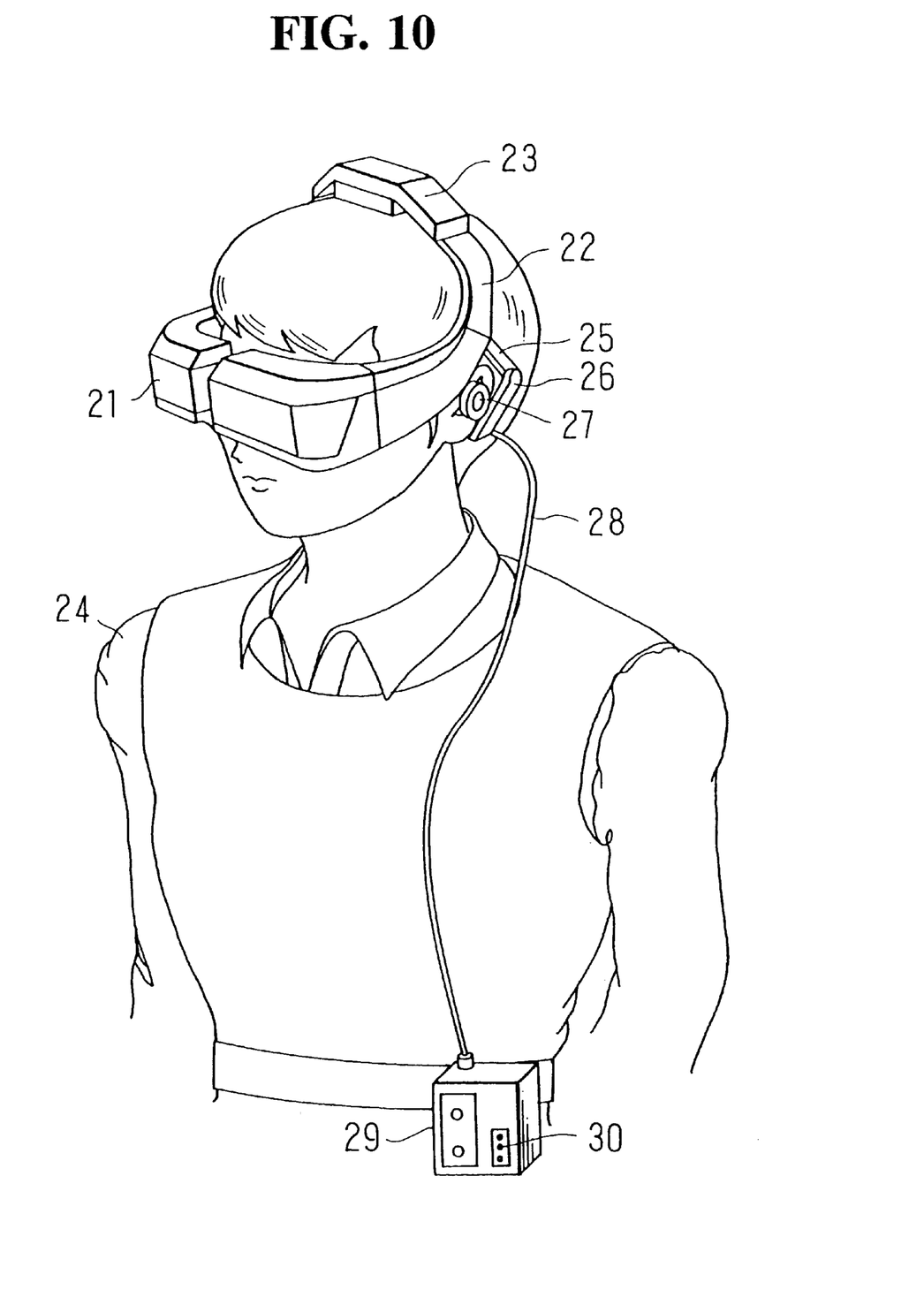

FIG. 10 shows an example of the head-mounted display (hereinafter referred to as HMD), which the image display device as shown in FIG. 1 is applied to. The HMD has a display body 21, a head side frame 22 and a head top frame 23. The display body 21 can be held on the face of the observer 24 by mounting the head side and top frames 23 and 24 on the heads of the observer 24. A rear frame 26 is mounted via a leaf spring 25 on the head side frame 22. The rear frame 26 has a loudspeaker 27 provided at a position corresponding to the position of an observer's ear.

Figure 11A:
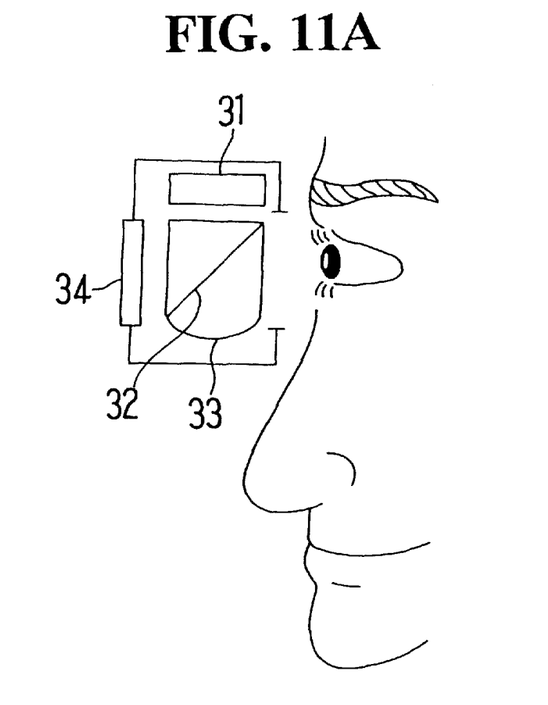
FIGS. 11A and 11B show optical systems in correspondence to the left and right eyeballs of the observer in the head-mounted display of FIG. 10.
Figure 11B:
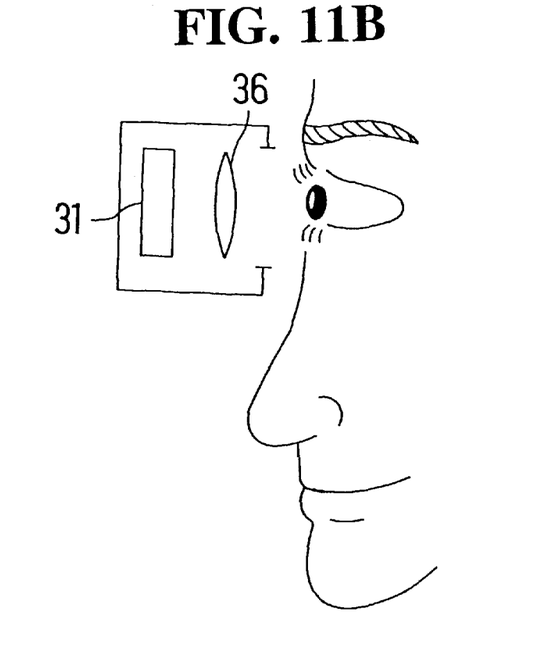

The display body 21 has optical system as shown in FIG. 11(*a*) or 11(*b*) in correspondence to the left and right eyeballs of the observer 24. The optical system shown in FIG. 11(*a*) is of see-through type. In this optical system, image from an image display device 31 which has a back light, a color LCD, a wobbling device and an optical low-pass filter, as shown in FIG. 1, is transmitted through a half-mirror prism 32, then reflected by a convex mirror 33 and then reflected by the half-mirror prism 32 to be led in an enlarged scale to the corresponding eyeball. In addition, external image is led through a liquid crystal shutter 34 and the half-mirror prism 32 to the corresponding eyeball. In the optical system as shown in FIG. 11(*b*), image form the image display device as shown in FIG. 1 is led through an eyepiece lens 36 to the corresponding to the eyeball.

The display body 31 is connected by a cable 28 to a reproducer 29 having a volume control means 30 for controlling the volume level of a voice signal. An image signal from the reproducer 29 is supplied to the left and right image display devices, while a speech signal is outputted from the loudspeaker 27.

The display body 21 may be connected via the cable 28 to an existing video deck or TV tuner for video display, and further it may be connected to a computer for displaying computer graphics images or message images from the computer. Furthermore, instead of using the cable 28, an antenna may be provided on the display body 21 for displaying external signals received as radio waves. Still further, image signals with a parallax therebetween may be supplied to and displayed on the left and right image display devices for stereo image observation.

In the above HMD, the color LCD constituting the image display device is as small as, for instance, 1.3 inches and has 300,000 pixels at the most. Making wobbling and filtering using such a color LCD is thus extremely effective for obtaining high resolution and high image quality with a wide picture angle MHD.

The embodiment of the present invention as described above is by no means limitative, and various changes and modifications are possible. For example, while the above embodiment used a color LCD as display device, the present invention is also effectively applicable to cases of using other display devices, such as monochromic LCDs, plasma displays, ELs and photochromics, etc. Also, while in the case of FIG. 1 light from the display device is coupled through the oscillating means to be incident on the light beam splitting means, it is also possible to couple light f from the display device through the light beam splitting means to be incident on the oscillating means. With this arrangement, the same effects as in the case of FIG. 1 are obtainable.

Furthermore, the directions of optical optical axis oscillation (i.e., wobbling) brought about by the oscillating means are not limited to be in the above embodiment, but may be set as desired. Also, the direction of splitting of the light beam by the light beam splitting means (i.e., the direction of refracting in FIG. 1) need not be substantially perpendicular to the wobbling directions. As a result of various experiments conducted by the inventor, it was confirmed that it is possible to do sufficiently remove the directional dependency of the image quality deterioration due to wobbling, so long as the intersection angle between the wobbling directions and the splitting direction is 20 degrees or above. In the above embodiment, the grooves of the diffraction grating 9 may be made to be substantially parallel to the vertical pixel columns in the color LCD 1 to obtain diffraction in the horizontal direction.

Figure 12A:
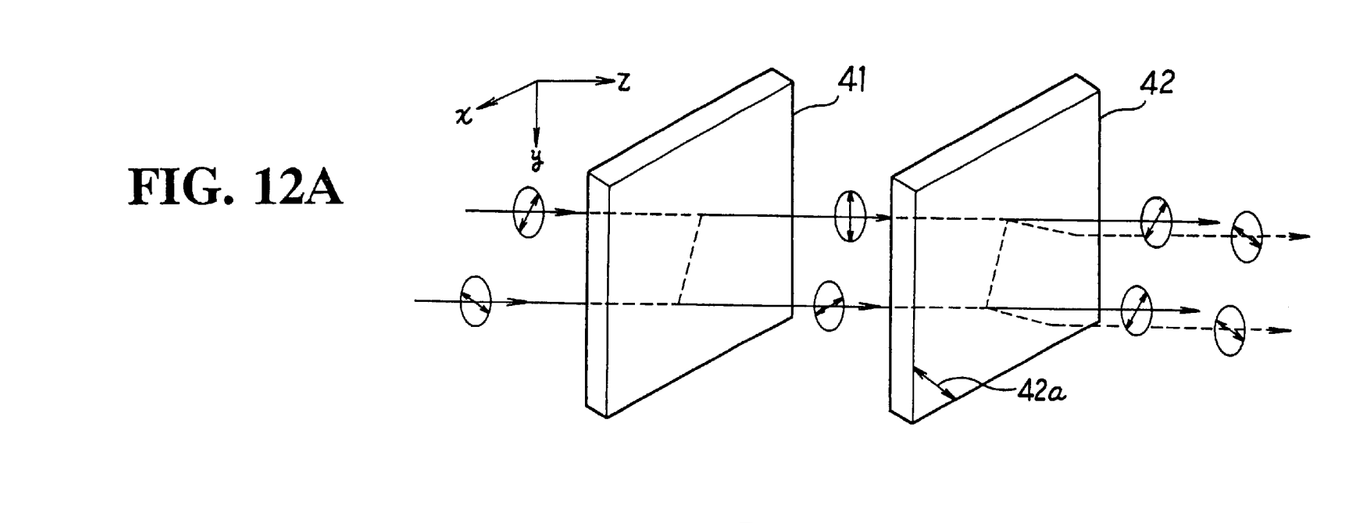
FIGS. 12A and 12B shows a drawing for explaining a modified embodiment of the present invention.
Figure 12B:
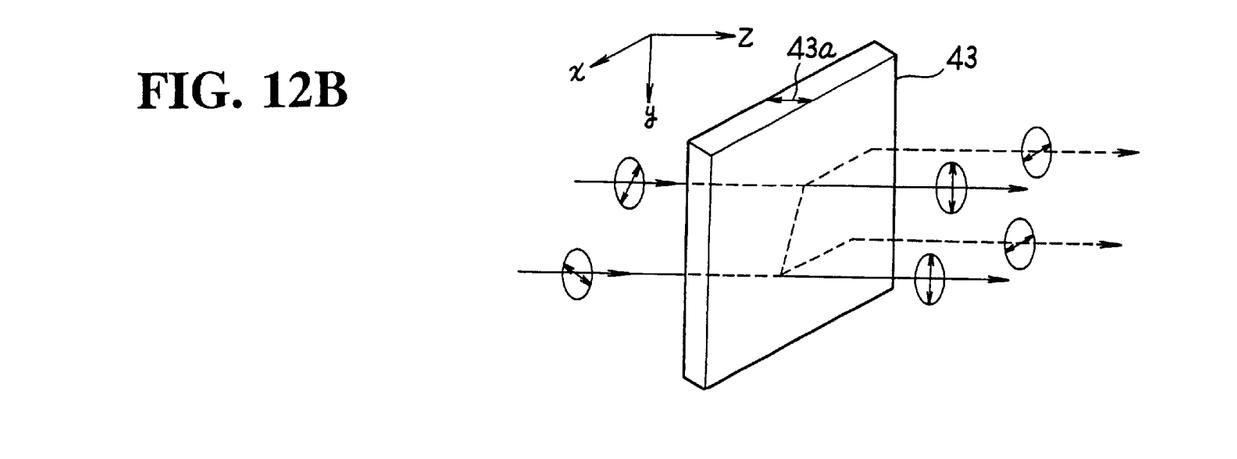

Moreover, the diffraction grating is not limitative as the light beam splitting means, but it is also possible to use an anisotropic crystal which is cheap and similar to that of the complex diffraction plate constituting the oscillating means. Where the optical axis of the light beam having been passed through the oscillating means is split in directions oblique to the horizontal pixel lines of the display device as in the above embodiment, the light beam splitting means may be formed by using a rotator 41 and a rock crystal plate 42 as shown in FIG. 12(*a*), so that the directions of polarization of the light beam from the oscillating means are rotated by the rotator 41 into horizontal and vertical polarizations, and that these polarizations are split by the rock crystal plate 42 in oblique directions. In this case, the crystallographic optical axis 42a of the rock crystal plate 42 is thus set to be in a direction slanted relative to the x-, y- and z-optical axis. When splitting the optical axis of the light beam from the oscillating means in directions parallel to the horizontal pixel lines of the display device, the light beam splitting means may be formed by using a rock crystal plate 43 as shown in FIG. 12(B). In to this case, the crystallographic optical axis 43a of the rock crystal plate 43 is set in a slanted direction in the x-z optical axis plane.

As has been described in the foregoing, according to the present invention the optical axis of the light beam emitted from the display face of the display device is wobbled in predetermined directions in synchronism to the display of different images on the display device, and the light beam from the display face is split into a plurality of split light beams in directions crossing the wobbling directions. It is thus possible to effectively remove the directional dependency of the image quality deterioration due to wobbling and permit observation of high resolution, high image quality images.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An image display device comprising:
    a display device having a display face with a plurality of pixels in a regular array;
    oscillating means for oscillating the optical axis of a light beam emitted from the display face in predetermined directions;
    image display control means for displaying different images on the display device in synchronism to the oscillation of the light beam optical axis caused by the oscillating means; and
    light beam splitting means for splitting the light beam from the display face into a plurality of split light beams in directions crossing the directions of the oscillation of the light beam optical axis caused by the oscillating means.

2. The image display device according to claim 1, wherein the light beam splitting means is a diffraction lattice.

3. The image display device according to claim 1, wherein the light beam slitting means is an anisotropic crystal.

4. The image display device according to one of claims 1 to 3, wherein the display device is a color display device having pixels of three colors in delta arrays, and the oscillating means is oscillates the optical axis of the light beam from the display face of the color display device in directions oblique to the horizontal array of the pixels such that the pixel pitches in the horizontal and vertical pixel array directions become substantially 0.75 and 0.5 pitches, respectively.

5. An image display device comprising:
    display means having a display face with a plurality of pixels in a regular array;
    wobbling means for wobbling or oscillating the optical axis of the light beam from the display device in predetermined directions in a timed relation to the display; and
    splitting means for splitting the light beam from the display means in directions crossing the wobbling directions into a plurality of split light beams.

6. The image display device according to claim 5, wherein a back light emitting white light is disposed behind the display means.

7. The image display device according to claim 5, wherein the display means is a color LCD.

8. The image display device according to claim 5, wherein the splitting means is an optical low-pass filter.

9. The image display device according to claim 5, wherein the wobbling means comprises a liquid crystal plate for changing polarization of an incident light and a complex refraction plate disposed ahead of the display means.

10. The image display device according to claim 9, wherein the complex refraction plate is formed from an anisotropic crystal including rock crystal ($\alpha$-$SiO_2$), lithium niobate ($LiNbO_3$), rutile ($TiO_2$), calcite ($CaCO_3$), soda-nitre ($NaNO_3$) or $YVO_4$.

11. The image display device according to claim 8, wherein the optical low-pass filter is a diffrattion grating having grooves extending in a direction, which is substantially coincident with the directions of wobbling caused by the wobbling means.

12. The image display device according to claim 11, wherein the diffraction grating is constructed such that the diffraction efficiency of light of 0-th degree is about 70% of the diffraction efficiency of light of ±1-st degree.

13. The image display device according to claim 7, wherein the color LCD includes R, G and B pixels in delta arrays in one half the NTSC system scan lines and odd and even field images of an image signal are displayed on the same pixels of the color LCD.

14. The image display device according to claim 5, wherein the display means is monochromic LCDS, plasma displays, ELs or photochromics.

15. The image display device according to claim 5, wherein the intersection angle between the wobbling directions and the splitting direction is 20 degrees or above.

16. The image display device according to claim 8, wherein the splitting means is an anisotropic crystal.

17. The image display device according to claim 16, wherein the anisotropic comprises a rotator and a rock crystal plate so that the directions of polarization of the light beam from the oscillating means are rotated by the rotator into horizontal and vertical polarizations, and that these polarizations are split by the rock crystal plate in oblique directions.

18. An image display method comprising steps of:
    wobbling an optical axis of the light beam emitted from display face of display means having a display face with a plurality of pixels in a regular array in predetermined directions in synchronism to the display of different images on the display device; and
    splitting the light beam from the display face into a plurality of split light beams in directions in crossing the wobbling directions.

* * * * *